W. H. SNYDER.
EDUCATIONAL APPLIANCE.
APPLICATION FILED FEB. 19, 1914.

1,150,550.

Patented Aug. 17, 1915.

3 SHEETS—SHEET 1.

Witnesses
O. M. Wennich
E. M. Klatcher

Inventor
Ward H. Snyder
by Gillson & Gillson
Attys.

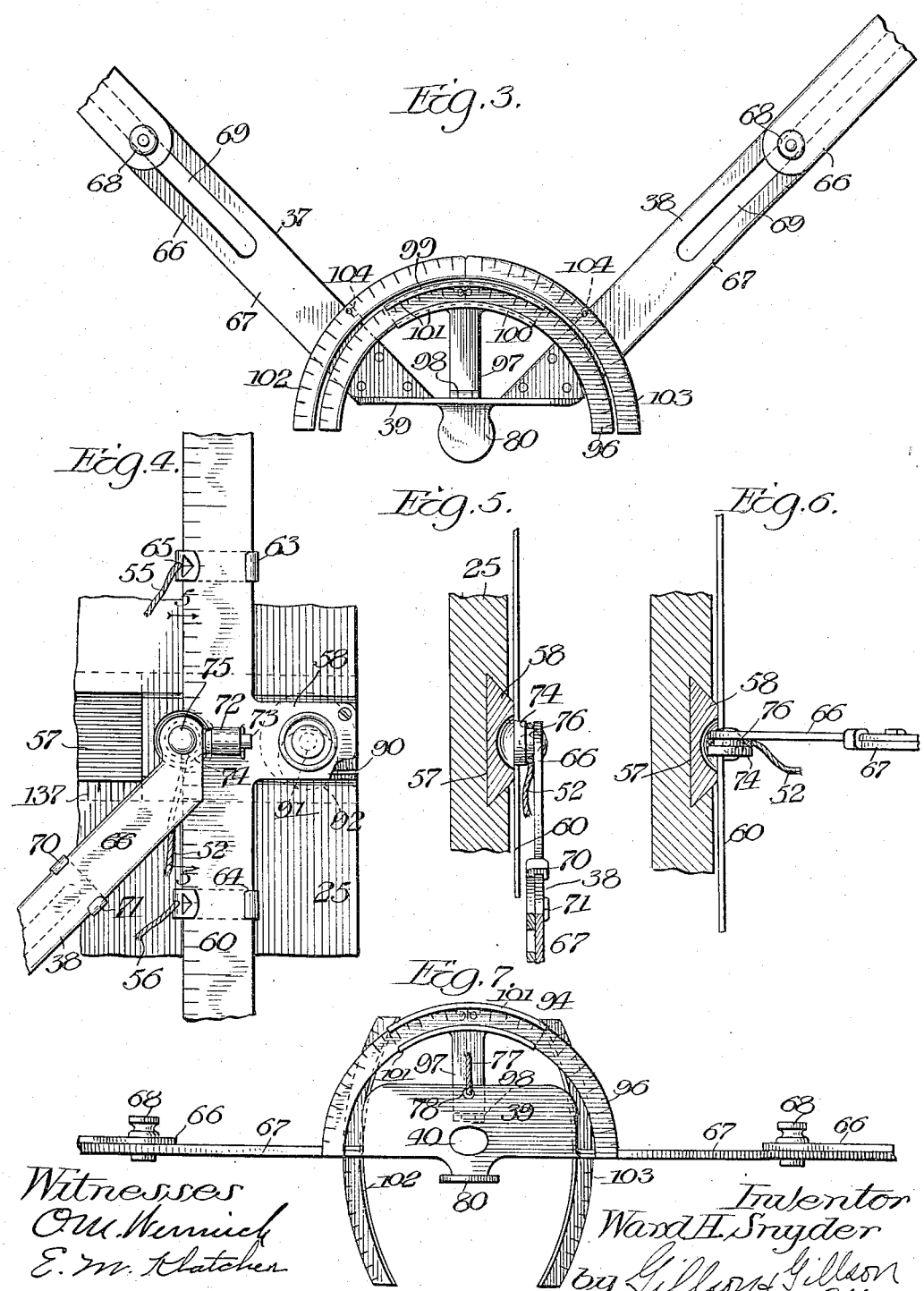

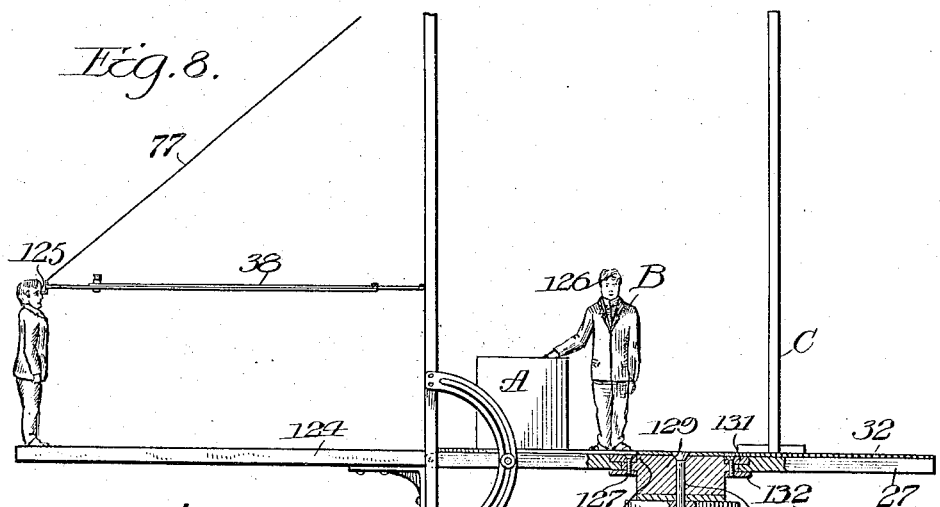
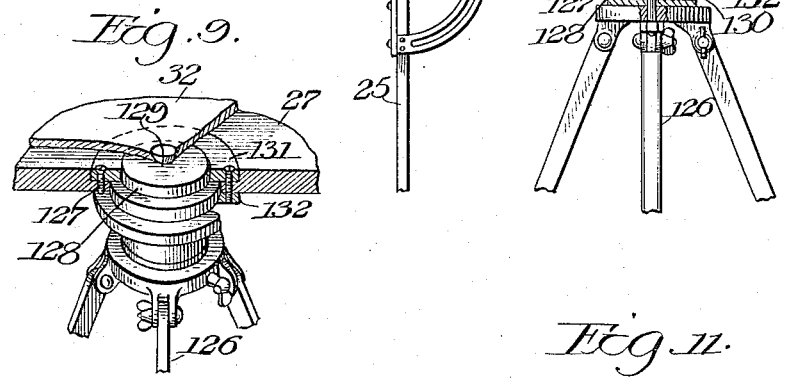
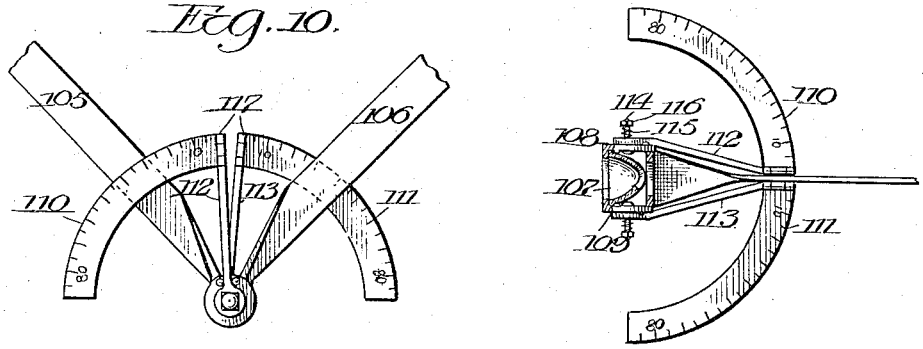

UNITED STATES PATENT OFFICE.

WARD H. SNYDER, OF CONGRESS PARK, ILLINOIS, ASSIGNOR TO LOTTIE B. SNYDER, OF CONGRESS PARK, ILLINOIS.

EDUCATIONAL APPLIANCE.

1,150,550.  Specification of Letters Patent.  Patented Aug. 17, 1915.

Application filed February 19, 1914. Serial No. 819,779.

*To all whom it may concern:*

Be it known that I, WARD H. SNYDER, a citizen of the United States, and resident of Congress Park, county of Cook, and State of Illinois, have invented certain new and useful Improvements in Educational Appliances, of which the following is a specification, and which are illustrated in the accompanying drawings, forming a part thereof.

The invention relates to educational appliances, and more particularly to devices for demonstrating the principles of so-called mechanical prespective in drawing.

The principal object of the invention is to provide apparatus which may be conveniently employed for making an optical demonstration of the principles employed in drawing objects in perspective and in laying out measured distances upon receding lines and planes.

Further objects of the invention will be apparent from the following description.

The invention is exemplified in the structures which are hereinafter described, and which are illustrated in the accompanying drawings, wherein—

Figure 1:
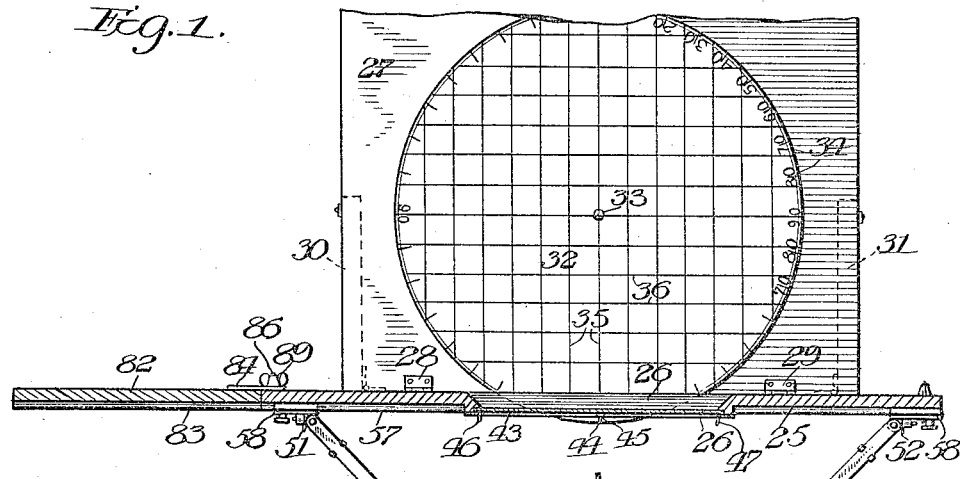
Figure 2:
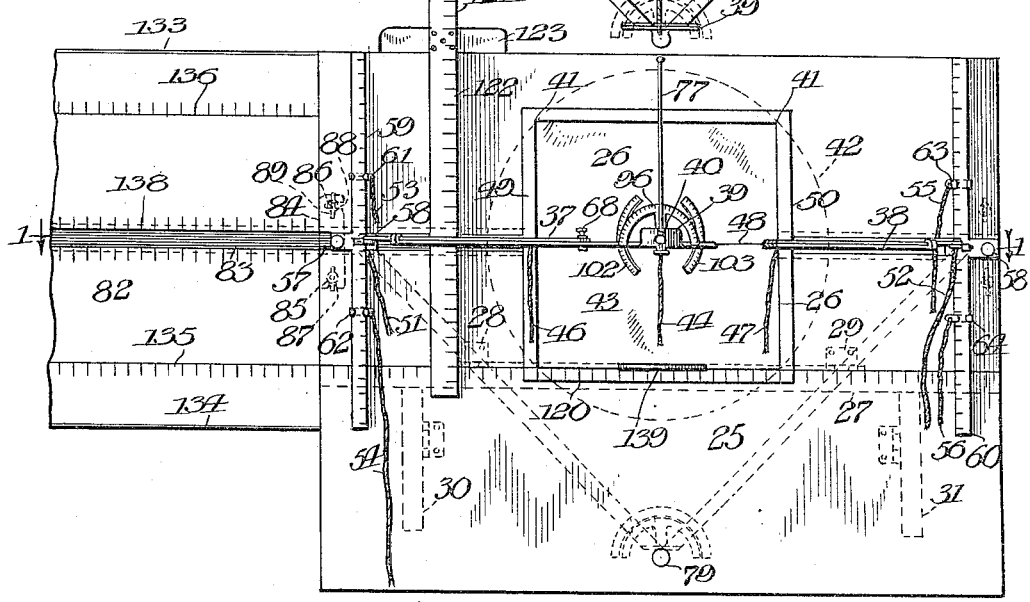

Figure 1 is a plan sectional view showing a form of apparatus which embodies the principal features of improvement provided by the invention, the plane of the section being indicated by the line 1—1 on Fig. 2; Fig. 2 is a front elevation of the apparatus illustrated in Fig. 1, a different position of certain of the parts being indicated by dotted lines; Fig. 3 is similar to a detail of Fig. 1, drawn to a larger scale; Fig. 4 is similar to a detail of Fig. 2, drawn to a larger scale, the position of the parts indicated by dotted lines in Fig. 2 being here shown in full lines; Fig. 5 is a detail sectional view principally taken on the line 5—5 of Fig. 4 but with some of the parts shown in elevation; Fig. 6 is similar to Fig. 5 but shows the parts in the position illustrated by full lines in Fig. 2; Fig. 7 is a detail front elevation of the apparatus illustrated in Fig. 1, drawn to an enlarged scale; Fig. 8 is a side elevation partly in section, showing a slightly modified form of the apparatus; Fig. 9 is a detail perspective view illustrating a form of joint which may be used in mounting the form of apparatus illustrated in Fig. 8 upon a suitable support; Fig. 10 is a detail plan view illustrating a still further modification in the construction; and Fig. 11 is a detail side elevation of the form of apparatus illustrated in Fig. 10, the parts being shown in a different position.

In carrying out the invention a board, as 25, having an opening 26 therein for viewing objects beyond the board, is preferably provided. The front face of this board corresponds with the plane of the picture which is seen by viewing objects through the said opening. It accordingly represents the paper upon which a drawing is to be made, or the so-called "picture plane". The board 25 is preferably supported in a vertical plane, as by being secured against one of the edges of a table 27. If desired the table 27 may serve for supporting objects to be viewed through the opening 26. It accordingly represents the picture field or ground.

In the form of apparatus which is more particularly illustrated in Figs. 1 and 2, the board 25 and table 27 are desirably connected to be folded together, as by hinges 28 and 29. In this instance a pair of side plates 30 and 31 are hingedly secured against the rear face of the board 25, in position to be extended beneath the table 27 to serve as legs for supporting the apparatus upon a suitable stand or desk (not shown).

Fig. 8 shows objects, as the cube A, the figure B, and the pole C, supported upon the table 27 to be viewed through the opening 26. To facilitate the turning of such objects to different angular positions with reference to the plane of the board 25, a disk 32 may be rotatably mounted upon the table 27. As most clearly shown in Fig. 1, the disk 32 is centrally apertured to receive and rotate upon a pin 33 which is fixed in the table 27 centrally in rear of the opening 26. Usually the disk 32 will be circular in outline, and angular distances about its circumference will be indicated thereon, as by numerals, one of which is shown at 34. Preferably also the surface of the disk 32 will be ruled with two relatively perpendicular series of parallel lines, as 35 and 36.

Preferably provision is made for viewing objects through the opening 26 from a fixed position in front of the board 25. To this end a plate 39, which is provided with a sight opening 40, is supported in front of the board. As shown, a pair of converging arms 37, 38, extend obliquely outward from the front of the board 25 and support the plate 39 at their point of intersection. It will now be understood that the position of the eye adjacent the sight opening 40 is the point which is represented by the so-called "station point" of a view drawn in mechanical perspective.

In order that objects viewed through the opening 26, from the sight opening 40, may be seen as they should be reproduced in a drawing, the parts of the apparatus are desirably so proportioned that the sight opening 40 is located at the distance from the front plane of the board 25 at which the so-called "picture plane" in the drawing is assumed to be removed from the eye, viz:— twelve feet, in the scale to which the apparatus is constructed. It has been found convenient to construct the apparatus in accordance with the scale of one inch to the foot. In this case the plate 39 will be supported at a point which is twelve inches in front of the plane of the front face of the board 25. The opening 26 is then made of rectangular outline, and of such a size that its corners, as 41, are located upon a circle 42 drawn upon the face of the board 25 to indicate the line of intersection with the plane of the board of the surface of a cone representing the usual angle of vision (viz:—as 60 degrees), and having its apex where the eye will be located in front of the sight opening 40. When the apparatus is constructed in this way objects seen through the opening 26 in the board 25, from the sight opening 40 in the plate 39, will appear as they should be reproduced in a drawing, in accordance with the usual practice of representing objects in mechanical perspective. To facilitate the use of the apparatus in the manner hereinafter described, a thin transparent plate 43, preferably of celluloid, is fitted in the opening 26 with its front face coincident with the plane of the front face of the board 25.

The apparent angle of the boundary lines of objects as the cube A, seen through the opening 26, is readily demonstrated by means of a straight edge pivotally attached at the center of the plate 43 so as to move over its surface. As shown, a string or cord 44 is employed for this purpose, and readily demonstrates the apparent angle of lines which extend perpendicularly away from the plane of the plate 43, by having one of its ends secured against the face of the plate 43 centrally in front of the sight opening 40, as at 45 (Fig. 1). When an end of the string 44 is secured against the face of the plate 43 at this point, it may be made to apparently coincide with any line which extends perpendicularly away from the plane of the plate. For example, the string 44, when stretched across the face of the plate 43, may be made to apparently coincide with any one of one of the sets of parallel lines, as 35, upon the face of the disk 32, when the disk 32 is so turned that these lines are perpendicular to the plate 43. The use of the string 44 will, therefore, serve to demonstrate the fact that all lines which extend perpendicularly away from the picture plane intersect upon the horizon at a point which is located directly in front of the eye. The point 45, at which the string 44 is attached to the plate 43, accordingly represents the so-called vanishing point for such lines.

In practice the application of a small quantity of sealing wax to the face of the plate 43 will serve for securing an end of the string 44 to the plate. If desired, other strings, as 46 and 47, may each have one end secured in position in the same manner. As shown, an end of each of the strings 46 and 47 is secured in place at the intersection of a horizontal line, as 48 (Fig. 2), which is drawn upon the face of the plate at the level of the sight opening 40, and one of the vertical margins, as 49 and 50, of the opening 26.

It will now be understood that the line 48 represents the so-called horizon line of a picture, the lower edge of the opening 26 being the ground line and each side of the opening being ten feet long in the scale to which the apparatus is constructed. The horizon line 48 is accordingly located the usual distance of five feet above the ground line, and the field of vision, represented by the circle 42, is the usual fourteen feet in diameter at the plane of the picture.

Strings, as 51, 52, 53, 54, 55 and 56, are desirably supplied for indicating the apparent angle of those lines which are located in rear of the plate 43, and which are oblique to the plane of the plate. One end of each of these last-mentioned strings is preferably adjustably fixed in position upon the front of the board 25. As shown, a horizontally disposed dove-tail groove 57 is formed in the board 25 at each side of the opening 26, and at the same level with the horizon line 48. A block, as 58, is slidingly fitted in each of the grooves 57. One end of each of the strings, as 51, 52, is fixed upon each of the blocks 58.

A vertical arm, as 59, 60, is secured to each of the blocks 58, and extends above and below the block in front of the face of the board 25. Clips, as 61, 62, 63 and 64, two of which are mounted upon each of the arms 59 and 60, serve for adjustably securing the remaining strings, as 53, 54, 55 and 56, in place. As shown, each of these clips takes the form of a strip of sheet metal folded about the corresponding arm 59, 60, to adjustably slide thereon, and provided with an aperture, as 65, for receiving an end of the corresponding string, as 55 (Fig. 4).

In some instances, as when the apparatus is to be used for the instruction of advanced students, the arms 37 and 38 are desirably made adjustable in length, and each is hingedly mounted at its inner end upon one of the sliding blocks 58. In all positions of the apparatus the arms 37 and 38 will desirably extend at right angles to each other. As shown, each of these arms is formed of two sections, as an inner section 66 and an outer section 67. When so constructed the outer sections 67 of the two arms are both formed integral with the plate 39. The two sections 66, 67, of each arm are overlapped and adjustably secured together, as by means of clamping screws 68 (Fig. 3). Each of these clamping screws preferably enters the outer section 67 of the corresponding arm through a slotted opening 69 formed in the inner section 66 of said arm. Additional means for securing the two sections 66, 67, together is provided by forming lateral wings, as 70, 71 (Fig. 4) upon the outer section 67 of each arm adjacent its inner end, these wings being folded over the margins of the corresponding inner section 66.

Each of the arms 37, 38, is most desirably secured upon the corresponding sliding block 58 in a manner to permit swinging of the arm in both a horizontal and a vertical plane. As most clearly shown in Fig. 4, a horizontally extended tubular socket 72 is fixed upon each of the sliding blocks 58. This socket serves to rotatably receive the stem 73 of an eyebolt 74. The corresponding arm, as 38, is pivotally secured to the eye-bolt 74, as by means of a pivot bolt 75, which passes through the inner section 66 of the arm adjacent its inner end and through the eye of the bolt. Preferably a bushing 76 is mounted upon the pivot bolt 75 between the inner section 66 of the arm and the head of the eye bolt 74. The bushing 76 is desirably equal in length to the thickness of the outer section 67 of the corresponding arm, as 38. The bushing accordingly serves as a means for supporting the inner section 66 of the arm in a position parallel to the plane of the board 25 when the arm is turned to the position illustrated by dotted lines in Fig. 2, and by full lines in Fig. 5. The bushing also serves as a place of attachment for the corresponding string 51 or 52. As most clearly shown in Figs. 5 and 6, this string is simply looped about the corresponding bushing 76.

Normally the arms 37 and 38 are supported in the horizontal position illustrated in Figs. 1 and 6, and by full lines in Fig. 2. For this purpose any convenient means may be provided for supporting the outer ends of the arms. As shown, a cord 77, having one end fixed to the board 25 adjacent its upper edge and its other end fixed to the plate 39, as by being passed through an opening 78 therein, is employed. Upon releasing the cord 77, the arms 37, 38, may be turned downwardly in front of the board 25 to the position shown by dotted lines in Fig. 2 and by full lines in Fig. 5. It will be observed that when the arms have been turned to this position, the point adjacent the sight opening 40, heretofore described as the station point, will now be located upon the face of the board 25, centrally below the field of vision and at a distance of twelve feet from the horizon line 48 in the scale upon which the apparatus is constructed. The apparatus accordingly serves for demonstrating the location of the station point at this place upon the plane of a drawing. The movement of the arms 37, 38, in a vertical plane is permitted by the turning of the stems 73 of the eye-bolts 74 in the corresponding tubular sockets 72 (Fig. 4).

Preferably provision is made for pivotally securing the arms 37, 38, against the board 25 for movement about an axis which is located at the point of intersection of the arms, or the so-called " station point". For this purpose a socket 79 is formed in the board 25, and a disk 80, which depends from the plate 39, is provided for entering the said socket. When the disk 80 is entered in the socket 79 the apparatus is conveniently adjusted by loosening the clamping screws 68 (Fig. 3) and then sliding the blocks 58 in the grooves 57. Angular movement of the arms incident to the sliding of the blocks is permitted by the turning of the disk 80 in the socket 79, and by the turning of the arms upon the pivot bolts 75 (Fig. 4). When the desired adjustment has been made, the clamping screws 68 may be again tightened and the arms 37, 38, raised to the horizontal position illustrated in Figs. 1 and 6, and by full lines in Fig. 2.

To permit the position of the blocks 58 to be adjusted through a considerable range without unduly enlarging the board 25, a plate 82, having a dove-tail groove 83 formed therein, is adapted to be detachably secured upon either end of the board. When this plate is fixed in position upon an end of the board 25, its dove-tail groove 83 serves as an extension of the groove 57 at the corresponding side of the opening 26. Owing to the fact that the arms 37 and 38 are both rigidly secured to the plate 39, outward movement of either of the blocks 58 is accompanied by an inward movement of the other block. A single plate 82, adapted to be secured against either end of the board 25, is accordingly sufficient.

Any convenient means may be employed for securing the plate 82 to the board 25. As shown, a bracket 84 is mounted upon the arm 82 and projects beyond the inner end of the same. A pair of studs, as 85, 86, project from the back of the board 25 adjacent either end, and the bracket 84 is provided with notches 87 and 88 for receiving the studs 85, 86, of either pair. Wing nuts 89, running upon the studs 85, 86, serve for clamping the bracket 84 against the back of the board 25.

In event provision for holding the blocks 58 against movement in the grooves 57 or 83 at any position of adjustment therein is desired, each block may be rendered expansible by forming a longitudinal kerf 90 in the same for a portion of its length. A stud 91, having an eccentric portion 92 formed thereon, is rotatably mounted in each block for separating the parts of the block at the two sides of the kerf.

Preferably a protractor, as 96, is provided for indicating the angular position of the arms 37 and 38 with reference to the line of vision from the sight opening 40 to the center of the plate 43. As shown, this protractor is located adjacent the intersection of the arms 37, 38, and is hingedly supported to permit of its being folded to an upright position, as in Fig. 2, in order that it may not obstruct the view from the sight opening 40 toward the plate 43 when not in use. As shown, an arm 97 is hingedly secured against the inner face of the plate 39 just above the sight opening 40, as at 98 (Fig. 7) for supporting the protractor 96. Most desirably the arm 97 is of T shape, the head of the T being formed with curved arms, as 99 and 100, for receiving the protractor 96. In order that the protractor may be shifted in position upon said arms, each arm has its two side edges overturned upon the protractor, as at 101 (Fig. 3), whereby the protractor is slidingly held.

Other protractors, as 102 and 103, are provided adjacent the intersection of the arms 37 and 38, for indicating the angular position of the cords 53, 54, 55, 56, when extended to the point of intersection of the arms from different positions of adjustment of the corresponding clips 61, 62, 63, 64. In order that these protractors may occupy a serviceable position when the arms 37 and 38 extend outwardly from the plane of the board 25, while not interfering with the folding of the arms to the position indicated by dotted lines in Fig. 2 and by full lines in Figs. 4 and 5, each of the protractors is hingedly mounted to permit of its being folded between the position indicated by dotted lines in Fig. 1 and the position indicated by full lines in Figs. 2 and 7. As shown, a hinge 104 serves for connecting an intermediate part of each of the protractors 102, 103, against the corresponding arm 37, 38.

In the use of the apparatus, if the two blocks 58 be located at equal distances from the opening 26, the arms 37 and 38 will each extend at an angle of 45 degrees from the plane of the board, as in Fig. 1. With the parts so adjusted the strings 51 and 52, being attached to the board 25 at the point of intersection of the arms 37 and 38, respectively, with the board, may be made to apparently coincide on the plate 43 with horizontal lines which extend rearwardly from the plane of the plate 43 at an angle of forty-five degrees in each direction. The points of attachment of the strings 51 and 52 to the board accordingly represent the so-called vanishing points of such lines. Similarly the strings 53, 54, 55 and 56 may be made to apparently coincide upon the plate 43 with lines, other than horizontal lines, which are located in planes extending at forty-five degrees to the plane of the plate 43. In each instance the angle of such lines with the horizontal will be determined by the angle of the corresponding string, as 55 (Fig. 4) to the horizontal, when extended to the point of intersection of the arms 37, 38, with each other, as shown upon the corresponding protractor, as 103, when turned to the upright position shown in Figs. 2 and 7. It will be understood that the clips 61, 62, 63 and 64 will be vertically shifted upon the corresponding arms 59 and 60, in accordance with the obliquity to the horizontal of the lines with which it is proposed to have the strings 53, 54, 55 and 56 appear to coincide upon the plane of the plate 43. In each instance the point of connection of the string, as 55 (Fig. 4), with the corresponding clip 64 represents the vanishing point for lines with which the string may be made to coincide.

In event it is desired that the strings 51, 52, 53, 54, 55 and 56 should be used for demonstrating the apparent slope of lines located in vertical planes which extend at angles, other than forty-five degrees, from the plane of the plate 43, the blocks 58 are to be shifted in position in the grooves 57 or 83. For this purpose, one of the arms 37, 38, will be extended and the other arm shortened, as heretofore described. In each instance the strings, as 51, 53 and 54, located at one side of the board, will demonstrate the apparent slope of lines which are in a plane perpendicular to the plane of lines which will appear to coincide on the plate 43 with the strings 52, 55 and 56 at the other side of the board.

The apparatus may also be used for demonstrating the location of a so-called "measuring point" upon a drawing with respect to the location of a given vanishing point. When the apparatus is arranged as in Figs. 1 and 2, the points of attachment of the strings 46 and 47 to the board 25 represent the so-called "measuring points," which correspond to the vanishing points represented by the points of attachment of the strings 52 and 51, respectively, to the board. By extending either one of these last mentioned strings, as 52, to the point of intersection of the arms 37 and 38, either when these arms are supported in the horizontal position or when they are laid against the board 25, and then swinging the free end of the length of string so extended to the horizon line 48, it will be found to intersect the same at the point of attachment of one of the measuring strings, as 46, to the board 25. By this means it can be demonstrated that a given measuring point is found by striking an arc through the station point, with the corresponding vanishing point as a center.

For measuring horizontal distances, a scale 120 is desirably extended across the face of the board 25 upon a level with the lower edge of the opening 26. That is to say, this scale is located upon a level with the so-called "ground line."

A T-square, generally designated 121, and having a ruled blade 122, serves for demonstrating the method of measuring vertical distances in mechanical perspective. For this purpose one of the measuring strings, as 46, will be extended across the plate 43 in position to appear to intersect the lower end of the object to be measured when viewed through the sight opening 40. The head, as 123, of the T-square 122 will now be applied to the upper edge of the board 25 in position to cause the blade 122 of the T-square to intersect the ground line 120 at the place where the said string, as 46, extends across the ground line. If now the said string, as 46, be moved over the plate 43 until it appears to intersect the higher end of the object to be measured, the true height of such object will be indicated by the place where the string intersects the blade 122 of the said T-square.

In the form of construction illustrated in Figs. 10 and 11, a pair of fixed arms 105 and 106 extend obliquely outward from a board (not shown) and serve for supporting an apertured cup, as 107, to which the eye of the observer may be applied. In this instance each arm 105, 106, is bifurcated adjacent its outer end, and the corresponding parts of the two arms are enlarged to form disks, as 108 and 109, at their points of intersection. The apertured cup 107 is conveniently supported between these disks.

If desired, a single pair of protractors, as 110 and 111, may be so mounted as to serve both for indicating angles in a horizontal plane and in a vertical plane. As shown, each of these protractors is secured at one end, by a hinge 117, to an angularly adjustable arm, as 112, 113. Each of these arms projects radially inward from one of the disks 108, 109. Preferably one of the arms, as 112, is located above the plane of the arms 105 and 106. The other arm, as 113, is desirably located below the plane of the arms 105 and 106. Each arm 112, 113, is pivotally mounted upon the corresponding disk 108, 109, as by means of a bolt 114 which extends vertically through the corresponding disk and through the arm. To prevent a too free movement of the arms 112 and 113, a spring 115 is coiled about each of the pivot bolts 114, and reacts between a shouldered end 116 of the bolt and the adjacent one of the two parts, as the arm 112 or 113, which the bolt connects.

When the protractors 110, 111, are to be used for indicating the angle of a line extending from the station point to a vanishing point on the horizon line, they are positioned as in Fig. 10. When they are to be used for indicating the angle of a line extending from the station point to a vanishing point located above or below the horizon line, they are positioned as in Fig. 11.

Fig. 8 of the drawings also shows a shelf 124, applied to the front of the board 25 at the level of the said ground line. This shelf may serve for supporting an image 125. If the image 125 be constructed to the same scale as the remainder of the apparatus, the head 126 will be upon the level of the arms, as 38, when said arms are extended in front of the board 25. The use of this image will serve for demonstrating the location of the horizon line at a fixed elevation, the location of the station point at a fixed distance in front of the picture, and the like.

In some instances it may be desirable to have the disk 32 held against rotation for supporting the objects, as the cube A, image B, and pole C, in a fixed position while permitting the board 25 to be moved about the same. For this purpose the table 27 is preferably mounted upon a tripod 127 (Fig. 8) and is centrally apertured, as at 128, to receive the head 129 of the tripod. The disk 32 is fixedly secured to the head of the tripod, as by a screw-bolt 130. Instanding annular flanges or rings 131, 132, are fixed to the table 27 about the aperture 128, and slidingly engage the rim of the head 129 of the tripod 127 upon opposite sides. The table 27 is thereby rotatably mounted upon the tripod while the disk 32 and objects mounted thereon are held in fixed position. Objects mounted upon the disk 32 may be viewed from various positions. It will be understood that the size of the disk 32 is immaterial, and that the apparatus is equally useful for viewing objects located beyond the limits of the disk, as, for example, a distant building, tower, or like object.

It will be noted that in any position of adjustment of the arms 37, 38, these arms are always connected to the board 25 at points which constitute the vanishing points for horizontal lines which recede from the plane of the picture at the angles indicated by the arms 37, 38, respectively, on the protractor 96.

Preferably the plate 82 will be of such width that one of its horizontal edges 133 or 134 will be upon a level with the upper edge of the board 25 and form an extension of the same for receiving the head 123 of the T square 121 when the plate is applied to either end of the board. Similarly the plate 82 will be ruled with scales 135 and 136, one of which will be on a level with and form a continuation of the ground line scale 120 when the plate is attached to either end of the board. If desired the grooves 57 will be marked off in degrees, as at 137 (Fig. 4) indicating the location of the end of the corresponding arm 37 or 38 in accordance with the reading of the protractor 96. These markings will preferably be continued along the groove 83, as at 138 (Fig. 2).

If desired the disk 32 may be formed with a reflecting surface as by making said disk from polished metal or silvered glass. When this is done the apparatus will be conveniently used for demonstrating the reflection of objects, as buildings and the like, in water. Preferably the plate 43 has a slotted aperture 139 through which an edge of the disk may project. When this is done access is conveniently had to an edge of the disk for turning the same.

I claim as my invention,—

1. In a device of the kind described, in combination, an upright board having an intermediate transparent section, and a frame hingedly connected to the board for movement about an axis which is located in the front plane of the board and which extends horizontally across its said transparent section between positions in which the frame extends horizontally outward in front of the board and contacts with the front face of the board respectively, said frame being constructed to indicate a station point for the location of the eye of an observer in viewing objects located beyond the board through its said transparent section in the first described position of the frame and to locate said station point upon the front face of the board in the second described position of the frame.

2. In a device of the kind described, in combination, an upright board having an intermediate transparent section, a frame extending outwardly in front of the board and constructed to indicate a station point for the location of the eye of an observer in viewing objects located beyond the board through its said transparent section, and a straight edge secured to the board for universal movement over the front face of the board about a point on the said transparent section of the board which is at the foot of a line perpendicular to the board and intersecting the said station point.

3. In a device of the kind described, in combination, an upright board having an intermediate transparent section, a frame extending horizontally outward from the front plane of the board and comprising a pair of rigidly connected relatively perpendicular arms constructed to provide a sight opening facing the board at their point of intersection the ends of the arms being connected to the board, and a pair of flexible cords or strings each having one end attached to the board at the point of connection therewith of one of the said arms of the frame and being movable thereabout over the transparent section of the board.

4. In a device of the kind described, in combination, an upright board having an intermediate transparent section, a frame extending horizontally outward from the front plane of the board and comprising a pair of rigidly connected relatively perpendicular longitudinally extensible arms constructed to provide a sight opening facing the board, at their point of intersection, the ends of the arms being slidingly connected to the board for adjustable movement thereon along a horizontal line, and a pair of flexible cords or strings each having one end attached to the board at the point of connection therewith of one of the said arms and being adjustable with the arm, the said cords being movable about their said respective points of connection with the board over the transparent section of the board.

5. In a device of the kind described, in combination, an upright board having an intermediate transparent section, a frame extending horizontally outward from the front plane of the board and comprising a pair of rigidly connected relatively perpendicular arms constructed to provide a sight opening facing the board at their point of intersection, the ends of the arms being connected to the board, a pair of strings or cords each having one end attached to the board at the point of connection therewith of one of the said arms of the frame and a second pair of cords or strings each having one end attached to the board at a point which is located on a line extending between the points of connection of the said arms of the frame with the board and at a distance from the point of connection of one of the said arms of the frame with the board equal to the length of said arm.

6. In a device of the kind described, in combination, an upright board having an intermediate transparent section, and a pair of rigidly connected relatively perpendicular arms constructed at their point of intersection to indicate a station point in front of the board for the location of the eye of an observer in viewing objects located beyond the board through its said transparent section in one position of the arms and to locate by contact with the board, said station point upon the front plane of the board in a different position of the arms, the ends of the arms being pivotally connected to the board for movement of the arms between the said two positions about an axis which is located upon the front plane of the board and constitutes the horizon line of the picture, the points of pivotal connection of the arms with the board indicating the vanishing points of horizontal lines in the picture which are parallel with the corresponding arm when the arms are in the first mentioned position.

7. In a device of the kind described, in combination, an upright board having an intermediate transparent section, and a pair of longitudinally extensible relatively perpendicular rigidly connected arms constructed at their point of intersection to indicate a station point in front of the board for the location of the eye of an observer in viewing objects located beyond the board through its said transparent section in any horizontal position of the arms and to locate, by contact with the board, said station point upon the front plane of the board in any vertical position of the arms, the ends of the arms having a horizontally sliding universal joint connection with the board for changing the length and inclination of the arms without shifting the said station point and for movement of the arms between vertical and horizontal positions about an axis which is located in the front plane of the board and constitutes the horizon line of the picture, the points of connection of the arms with the board indicating at all times the vanishing points of horizontal lines in the picture which are parallel with the adjacent arm in the corresponding horizontal position of the same.

8. In a device of the kind described, in combination, an upright board having an intermediate transparent section of rectangular shape, a pair of blocks slidingly mounted on the board for horizontal movement along the same at opposite sides of the said transparent section and at the level of the mid height of such section, a frame comprising a pair of rigidly connected relatively perpendicular longitudinally extensible arms constructed to indicate a station point for the location of the eye of an observer at their point of intersection, a hinge connecting the end of each of said arms of the frame with one of the said blocks to permit swinging of the arm about both a horizontal and a vertical axis, and a pair of flexible cords or strings each having one end fixed upon one of the said blocks.

9. In a device of the kind described, in combination, an upright board having an intermediate transparent section, a frame extending horizontally outward from the front plane of the board and comprising a pair of rigidly connected relatively perpendicular arms constructed to indicate at their point of intersection, a station point facing the board for the location of the eye of an observer, the ends of the arms being connected to the board, and a pair of flexible cords or strings each having one end adjustably attached to the board for movement thereon along a vertical line intersecting the point of connection of one of the arms of the said frame with the board.

10. In a device of the kind described, in combination, an upright board having an intermediate transparent section, a pair of blocks slidingly mounted on the board for horizontal movement along the same at opposite sides of the said transparent section, a pair of rods extending vertically over the board, each rod being secured to one of the said blocks for movement therewith, a clip running on each rod, a pair of strings or cords, each having an end secured to one of the said clips, and a frame comprising a pair of rigidly connected relatively perpendicular longitudinally extensible arms constructed to indicate at their point of intersection a station point facing the board for the location of the eye of an observer, each of said arms being hingedly connected to one of the said blocks for relative movement thereon about a vertical axis.

11. In a device of the kind described, in combination, an upright board having an intermediate transparent section, a table located in rear of the board, the table and board being mounted for relative angular movement about a vertical axis, a pair of longitudinally extensible relatively perpendicular rigidly connected arms constructed at their point of intersection to indicate a station point in front of the board for the location of the eye of an observer in viewing objects on the said table through the said transparent section of the board, the ends of the arms having a horizontally sliding pivotal connection with the board for changing the length and inclination of the arms without shifting the said station point, means for indicating the inclination of the arms to the board and means for indicating the relative angular positions of the board and table, the points of connection of the arms with the board indicating at all times the vanishing points of the horizontal edges of objects on the table which are parallel with the adjacent arm.

12. In a device of the kind described, in combination, an upright board having an intermediate transparent section, a pair of longitudinally extensible relatively perpendicular arms constructed at their point of intersection to indicate a station point in front of the board for the location of the eye of an observer in viewing objects in rear of the board through its said transparent section, and a protractor carried by the arms for indicating the inclination of the arms to a line of sight normal to the board from said station point, the ends of the arms having a horizontally sliding pivotal connection with the board permitting the changing of the length and the said inclination of the arms without shifting the said station point and the points of connection of the arms with the board indicating at all times the vanishing points of the edges of the objects viewed which are parallel with the corresponding arm.

13. In a device of the kind described, in combination, an upright board having an intermediate transparent section, a table located in rear of the board, the table and board being mounted for relative angular movement about a vertical axis, a scale upon which changes in the relative angular position of the board and table are indicated, and a frame hingedly connected with the board for movement between positions in which the frame extends horizontally outward in front of the board and in which the frame contacts with the front face of the board, respectively, said frame being constructed to indicate a station point for the location of the eye of an observer in viewing objects placed on the table through the said transparent section of the board in the first described position of the frame and the axis of the hinge connection of the frame with the board being horizontal, in the front plane of the board, and on a level with the said station point in the first described position of the frame whereby it coincides with the horizontal line of the picture and the frame indicates the position of the station point upon the picture plane when in its second described position.

14. In a device of the kind described, in combination, an upright board having an intermediate transparent section, a table located in rear of the board, the board and table being mounted for relative angular movement about a vertical axis, a scale upon which changes in the relative angular position of the board and table are indicated, and a frame constructed to indicate a station point in front of the board for the location of the eye of an observer in viewing objects placed on the said table through the said transparent section of the board.

15. In a device of the kind described, in combination, a vertical board having a transparent section, a frame mounted in front of the board for indicating a sight station, and a table back of the board and being rotatable in the plane of its surface.

16. In a device of the kind described, in combination, a vertical board having a transparent section, a frame comprising a pair of rigidly united relatively perpendicular arms having their ends attached to the board at opposite sides of its transparent section, and a table back of such transparent section such table being rotatable in the plane of its surface and having its surface marked off into rectangular sections.

WARD H. SNYDER.

Witnesses:
E. M. KLATCHER,
O. M. WERMICH.

Copies of this patent may be obtained for five cents each, by addressing the "Commissioner of Patents, Washington, D. C."